US008262009B2

(12) United States Patent
Todd et al.

(10) Patent No.: US 8,262,009 B2
(45) Date of Patent: Sep. 11, 2012

(54) SYSTEM FOR ELECTRICAL CABLE MANAGEMENT IN LIMITED ROTATION APPLICATIONS

(75) Inventors: Christian Allen Todd, Parker, CO (US); Wyatt Erickson, Kenmore, WA (US)

(73) Assignee: Quantum Corporation, San Jose, CA (US)

( * ) Notice: Subject to any disclaimer, the term of this patent is extended or adjusted under 35 U.S.C. 154(b) by 1065 days.

(21) Appl. No.: 12/190,486

(22) Filed: Aug. 12, 2008

(65) Prior Publication Data

US 2010/0038108 A1 Feb. 18, 2010

(51) Int. Cl.
*B65H 75/48* (2006.01)
(52) U.S. Cl. ........ 242/388; 242/370; 242/378; 242/379; 174/69; 174/135
(58) Field of Classification Search .......... 174/69, 174/135; 29/896.7, 592; 242/158.3, 801, 242/615.12, 854, 609, 613, 345, 482.4, 607, 242/410, 388, 901, 378–379, 388.1, 388.6
See application file for complete search history.

(56) References Cited

U.S. PATENT DOCUMENTS

| 5,080,295 | A  | * | 1/1992 | Hongo et al. | 242/419.9 |
|---|---|---|---|---|---|
| 5,332,171 | A  | * | 7/1994 | Steff | 242/378 |
| 6,199,784 | B1 | * | 3/2001 | Wang et al. | 242/378 |
| 6,375,109 | B1 | * | 4/2002 | Liao | 242/378 |
| 6,390,261 | B1 | * | 5/2002 | Liao | 191/12.2 R |
| 6,416,005 | B1 | * | 7/2002 | Liao | 242/378.1 |
| 6,726,140 | B2 | * | 4/2004 | Wivagg | 242/378.2 |
| 7,032,728 | B2 | * | 4/2006 | Harcourt | 191/12.2 R |

* cited by examiner

*Primary Examiner* — Angel R Estrada
*Assistant Examiner* — Dimary Lopez
(74) *Attorney, Agent, or Firm* — Baker Botts L.L.P.

(57) ABSTRACT

A system for managing a flexible electrical cable for use in limited rotational applications is provided. The system includes a main hub coupled with a substrate, the main hub comprising an outer hub portion, an inner cavity portion and a gap portion, the main hub rotatable about a stationary post disposed inside the inner cavity portion and coupled with the substrate. The system is for managing a contiguous length of flexible electrical cable having a first free end and a second end, the second end electrically coupled to the inner post wherein a first portion of the flexible electrical cable proximate the free end is wrapped around the outer hub portion in a first direction and a second portion of the flexible electrical cable proximate the second end is wrapped inside the inner cavity portion in a second direction and wherein the contiguous length of flexible electrical cable passes through the gap portion of the main hub.

13 Claims, 4 Drawing Sheets

400

Providing a main hub coupled with a substrate, the main hub comprising an outer hub portion, an inner cavity portion and a gap portion, the main hub rotatable about a stationary post disposed inside the inner cavity portion and coupled with the substrate
402

↓

Providing a contiguous length of flexible electrical cable having a first free end and a second end, the second end electrically coupled to the inner post wherein a first portion of the flexible electrical cable proximate the free end is wrapped around the outer hub portion in a first direction and a second portion of the flexible electrical cable proximate the second end is wrapped inside the inner cavity portion in a second direction opposite the first direction and wherein the contiguous length of flexible electrical cable passes through the gap portion of the main hub
404

↓

Providing an idler coupled with the substrate and disposed adjacent to the main hub for guiding the flexible electrical cable onto the outer hub portion
406

↓

Providing a tensioner coupled with the main hub, the tensioner for maintaining a constant tension on the flexible electrical cable
408

FIG. 4

SYSTEM FOR ELECTRICAL CABLE MANAGEMENT IN LIMITED ROTATION APPLICATIONS

BACKGROUND

Robots and other electromechanical systems have a need to be attached by one or more cables for power and control. These cables need to vary in length or be moved out of the way as the device moves through its motions. The cables need to be managed so that they are not damaged and are not interfering with the operation of the device.

Cable carriers are one solution that is used, but they are expensive and bulky. Another solution is using a slip ring electrical connection between the device and the cable. A slip ring is a type of electrical swivel and enables rotational motion of the cable without physically twisting the cable. However, as with cable carriers, slip rings are expensive.

Other solutions involve folding cables or twisting them to consume extra length. This solution has limited reliability and can cause performance issues. A low cost and reliable solution would be an improvement over current cable management solutions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system for managing a flexible electrical cable for use in limited rotational applications is provided. The system includes a main hub coupled with a substrate, the main hub comprising an outer hub portion, an inner cavity portion and a gap portion, the main hub rotatable about a stationary post disposed inside the inner cavity portion and coupled with the substrate. The system is for managing a contiguous length of flexible electrical cable having a first free end and a second end, the second end electrically coupled to the inner post wherein a first portion of the flexible electrical cable proximate the free end is wrapped around the outer hub portion in a first direction and a second portion of the flexible electrical cable proximate the second end is wrapped inside the inner cavity portion in a second direction and wherein the contiguous length of flexible electrical cable passes through the gap portion of the main hub.

A method for managing a flexible electrical cable for use in limited rotational applications is also provided.

DESCRIPTION OF THE DRAWINGS

The accompanying drawings, which are incorporated in and form a part of this specification, illustrate embodiments of the subject matter and, together with the description, serve to explain principles discussed below:

FIG. 4 shows a flow diagram of an exemplary method for managing a flexible cable, according to an embodiment.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Embodiments of the present invention provide a low cost solution to cable management. One embodiment of the invention includes a low cost cable management device that enables cable management by providing a positive tension of a flexible cable throughout a limited range of motion. Embodiments of the present invention can be used as a low cost and reliable alternative to an electrical swivel, such as a slip ring.

Figure 1:
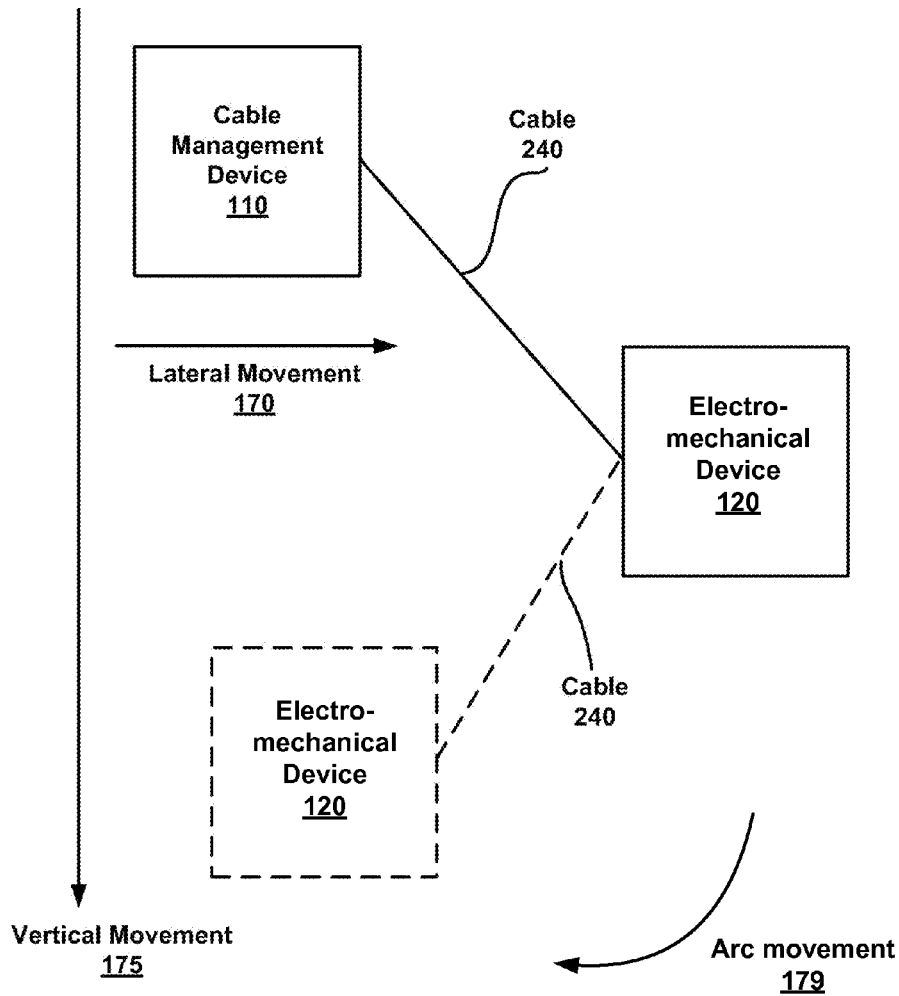
FIG. 1 is a diagram of an example cable management device in a first position and a second position incorporating an embodiment of the subject matter described herein.

FIG. 1 is a diagram of an example cable management device 110 incorporating an embodiment of the subject matter described herein. It is appreciated that the cable management device 110 of the present invention is used to manage cable connections to a moving electromechanical device 120. The cable management device 110 of the present invention can be coupled in any number of configurations with the moving electro-mechanical device 120 including being incorporated within the moving electromechanical device 120.

The cable management device 110 of the present invention enables an electrical coupling of a moving electromechanical device 120 with a moving electro-mechanical device control unit 147 while the electromechanical device moves. FIG. 1 shows the moving electro-mechanical device 120 in a first position (indicated by the solid line) and a second position (indicated by the dotted line).

The cable management device 110 of the present invention can be scaled in size to accommodate various lengths of cable and various movement requirements between the cable management device and the moving electro-mechanical device 120.

The cable management device 110 of the present invention provides a positive tension on cable 240 among various positions and movements, including vertical movement 175, lateral movement 170 and any other limited motions, including are movements 179. Although FIG. 1 shows a stationary cable management device 110 and a moving electromechanical device 120, it is appreciated that the cable management device could also be moving.

Figure 2:
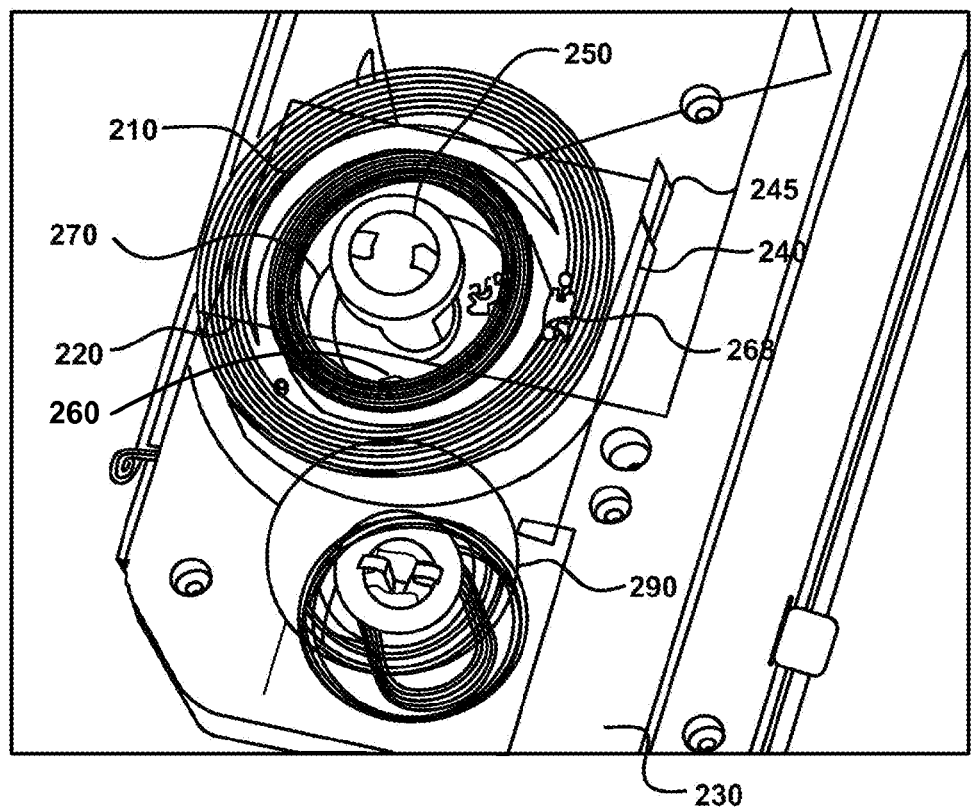
FIG. 2 shows an illustration of an exemplary cable management device with a main hub, an idler and a contiguous cable, according to an embodiment.

FIG. 2 shows a block diagram of an exemplary cable management device 110 with a main hub 210, an idler 290 and a contiguous cable 240, according to an embodiment. The main hub 210 is coupled with a substrate 230, the main hub 210 comprises an outer hub portion 220, an inner cavity portion 270 and a gap portion 268, the main hub 210 is rotatable about a stationary post 250 disposed inside the inner cavity portion 270 and coupled with the substrate 230. It is appreciated that the cable management device 110 of FIG. 2 may have a cover (not shown) that encloses the moving parts of the cable management device 110.

The cable management device 110 is for managing a contiguous length of flexible electrical cable 240 having a first free end 245 and a second end 260, the second end 260 electrically coupled to the inner post 250 wherein a first portion of the flexible electrical cable 240 proximate the free end 245 is wrapped around the outer hub portion 220 in a first direction (FIG. 2 shows the cable 240 wrapped around the outer hub portion 220 in a counterclockwise direction). For clarity, FIG. 2 shows the second end 260 in a free position, however, it is appreciated that when implemented, the second end 260 is interfaces to a board inside of the post 250. The cable 240 could be fed through but must be mechanically attached to the post 250 to prevent unwinding.

A second portion of the flexible electrical cable 240 proximate the second end 260 is wrapped inside the inner cavity portion 270 in a second direction (FIG. 2 shows the cable 240 wrapped inside the inner cavity portion 270 in a clockwise direction) and wherein the contiguous length of flexible electrical cable 240 passes through the gap portion 268 of the main hub. The gap portion 268 can be a relief in the outer hub portion 220 that enables the cable 240 to pass from the outer hub portion 220 to the inner cavity portion 270 without requiring an electrical connection.

It is appreciated that the first portion and second portions of the cable may be wrapped in opposite directions (e.g., clockwise and counterclockwise), however, it is appreciated that the cables may be wrapped in the same directions. For example, referring to FIG. 2, the cable 240 wrapped around the outer hub portion 220 in a counterclockwise direction and the cable 240 could be wrapped inside the inner cavity in the same counterclockwise direction.

As the cable 240 is pulled from the outer hub portion, the spiral wrapped portion of the cable 240 inside the inner cavity portion 270 winds up around the stationary post 250. The cable is one contiguous segment and therefore does not require intermediary connections between ends 245 and 260. Having one contiguous segment of cable 240 enables high levels of cable movement without sacrificing reliability. In one embodiment, the cable management device 110 is capable of storing ten or more revolutions of cable 240 on the outer hub portion 220. In one embodiment, a corresponding number of revolutions of cable 240 can be stored in the inner cavity portion 270.

In one embodiment, the cable management device 110 also includes an idler 290 coupled with the substrate 230 and is disposed adjacent to the main hub 210. The idler 290 is for guiding the flexible electrical cable 240 onto the outer hub portion 220 in a wide range of movements. The idler(s) enable the cable to move freely without interfering with any parts of the cable management device 110. It is appreciated that the cable management device 11 0 may include any number of idlers and idler configurations depending in the range of proposed motion and may not include an idler.

Figure 3:
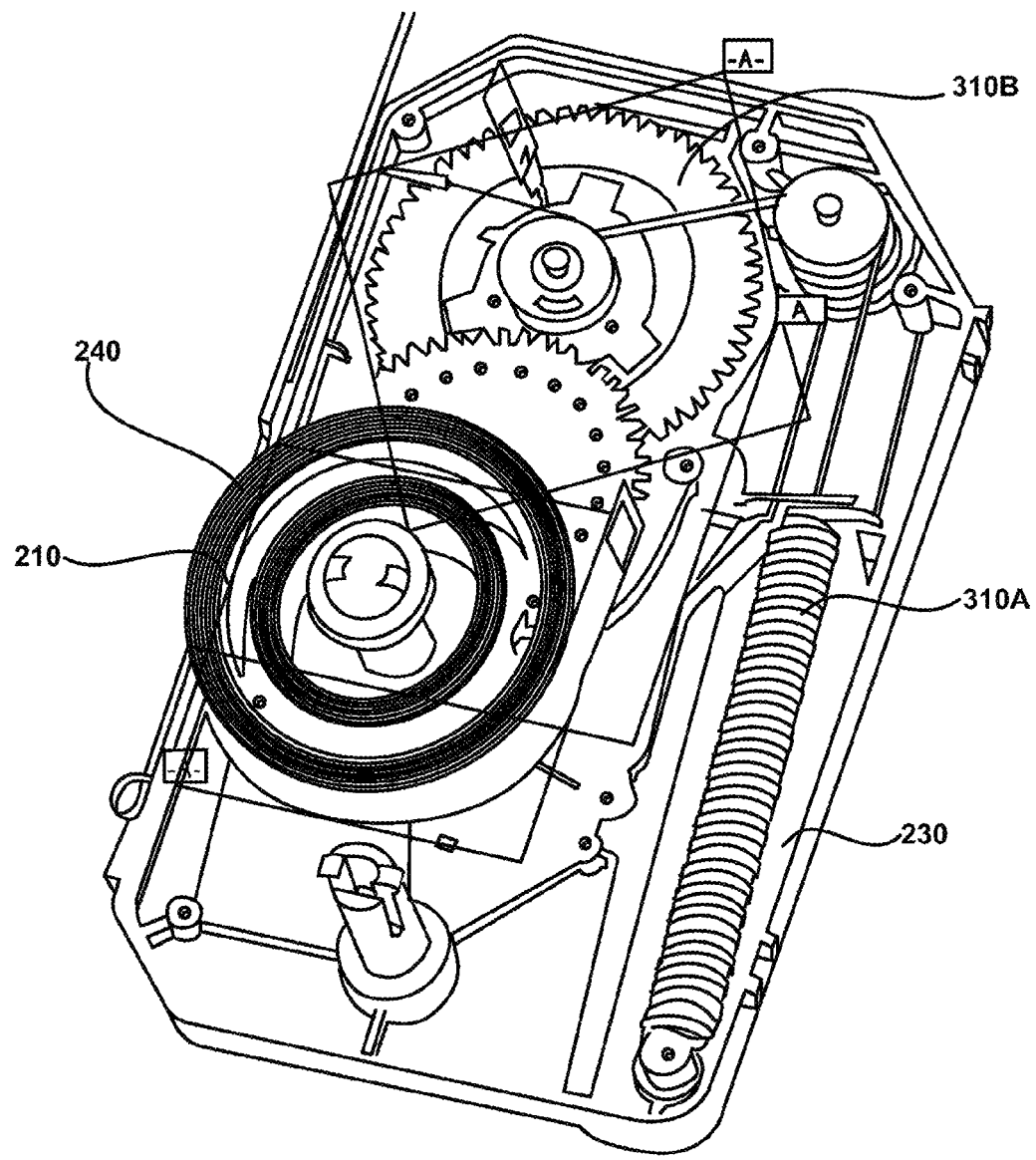
FIG. 3 shows an illustration of an exemplary cable management device with a main hub, a tensioner device and a contiguous cable, according to an embodiment.

FIG. 3 shows a block diagram of an exemplary cable management device 110 with a main hub, a tensioner device 310A and 310B and a contiguous cable 240, according to an embodiment. The tensioner 310A and 310B enables a positive tension on the cable 240 regardless of movement or position.

FIG. 3 illustrates the use of a linear spring portion 310A for providing a linear force that can be converted, by the use of gears 310B to rotational force. The rotational force is applied to the main hub 210 and provides a positive tension on cable 240 throughout its range of motion. Although a gear 310B and spring 310A combination is illustrated, it is appreciated that any number of configurations and mechanisms can be used to provide a rotational force to the main hub 210. For example, linear spring 310A could be replaced by a constant force spring, shock or elastomeric device capable of providing a tensional force.

In one embodiment, the substrate 230 comprises an inner cavity. For example, the device in FIG. 3 may have a cover portion (not shown) that can be used to enclose the moving parts of the cable management device 110. In one embodiment, the tensioner 310A and 310B is disposed within the inner cavity of the substrate.

FIG. 4 shows a flow diagram of an exemplary method 400 for managing a flexible cable, according to an embodiment.

At 402, 400 includes providing a stationary post and a main hub coupled with a substrate, the main hub comprising an outer hub portion, an inner cavity portion and a gap portion, the main hub rotatable about the stationary post disposed inside said inner cavity portion and coupled with said substrate.

At 404, 400 includes providing a contiguous length of flexible electrical cable having a first free end and a second end, the second end electrically coupled to the inner post wherein a first portion of the flexible electrical cable proximate the free end is wrapped around the outer hub portion in a first direction and a second portion of the flexible electrical cable proximate the second end is wrapped inside the inner cavity portion in a second direction and wherein the contiguous length of flexible electrical cable passes through the gap portion of the main hub.

At 406, 400 includes providing an idler coupled with the substrate and disposed adjacent to the main hub for guiding the flexible electrical cable onto the outer hub portion.

At 408, 400 includes providing a tensioner coupled with the main hub, the tensioner for maintaining a positive tension on the flexible electrical cable.

Thus, embodiments of the present invention that provide a low cost solution to cable management have been described. The low cost cable management device of the present invention that enables reliable cable management by providing a positive tension of a flexible cable throughout a limited range of motion without the use of an electrical swivel.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for managing a flexible electrical cable for use in limited rotational applications comprising:
   a main hub coupled with a substrate, said main hub comprising an outer hub portion, an inner cavity portion and a gap portion, said main hub rotatable about a stationary post disposed inside said inner cavity portion and coupled with said substrate;
   a contiguous length of flexible electrical cable having a first free end and a second end, said second end electrically coupled to said stationary post wherein a first portion of said flexible electrical cable proximate said free end is wrapped around said outer hub portion in a first direction and a second portion of said flexible electrical cable proximate said second end is wrapped inside said inner cavity portion in a second direction and wherein said contiguous length of flexible electrical cable passes through said gap portion of said main hub; and a tensioner coupled with said main hub, said tensioner for maintaining a positive tension on said flexible electrical cable, wherein said substrate comprises an inner cavity and wherein said tensioner is disposed within said inner cavity of said substrate.

2. The system of claim 1 wherein said first and second directions are the same.

3. The system of claim 1 wherein said first and second directions are opposite.

4. The system of claim 1 further comprising:
an idler coupled with said substrate and disposed adjacent to said main hub for guiding said flexible electrical cable onto said outer hub portion.

5. The system of claim 1 wherein said tensioner comprises a linear spring wherein said linear spring enables rotation of said main hub.

6. The system of claim 1 wherein said flexible electrical cable is wrapped over said outer hub portion more than ten times in a retracted position.

7. The system of claim 1 wherein said flexible electrical cable is wrapped in said inner cavity portion more than ten times in an extended position.

8. The system of claim 1 wherein in response to said flexible electrical cable being pulled from said outer hub portion, said flexible electrical cable is simultaneously wound inside said inner cavity portion.

9. A system for maintaining a positive tension of a flexible electrical cable comprising:
a main hub coupled with a substrate, said main hub comprising an outer hub portion, an inner cavity portion and a gap portion, said main hub rotatable about a stationary post disposed inside said inner cavity portion and coupled with said substrate;

a contiguous length of flexible electrical cable having a first free end and a second end, said second end electrically coupled to said stationary post wherein a first portion of said flexible electrical cable proximate said free end is wrapped around said outer hub portion in a first direction and a second portion of said flexible electrical cable proximate said second end is wrapped inside said inner cavity portion in a second direction and wherein said contiguous length of flexible electrical cable passes through said gap portion of said main hub;

an idler coupled with said substrate and disposed adjacent to said main hub for guiding said flexible electrical cable onto said outer hub portion; and a tensioner coupled with said main hub, said tensioner for maintaining a positive tension on said flexible electrical cable.

10. The system of claim 9 wherein said substrate comprises an inner cavity and wherein said tensioner comprises a gear portion and is disposed within said inner cavity of said substrate.

11. The system of claim 9 wherein said flexible electrical cable is wrapped over said outer hub portion more than ten times in a retracted position.

12. The system of claim 9 wherein said flexible electrical cable is wrapped in said inner cavity portion more than ten times in an extended position.

13. The system of claim 9 wherein in response to said flexible electrical cable being pulled from said outer hub portion, said flexible electrical cable is simultaneously wound inside said inner cavity portion.

* * * * *